United States Patent

[11] 3,607,545

| [72] | Inventors | John T. Parsons;<br>Jack L. Ritchey, both of Traverse City, Mich. |
|------|-----------|---|
| [21] | Appl. No. | 751,297 |
| [22] | Filed     | Aug. 8, 1968 |
| [45] | Patented  | Sept. 21, 1971 |
| [73] | Assignee  | Hitco<br>Gardena, Calif. |

[54] METHOD FOR ADHESIVELY BONDING HELICOPTER ROTOR BLADE ASSEMBLIES
3 Claims, 4 Drawing Figs.

[52] U.S. Cl. .................................................. 156/311,
156/583, 156/321
[51] Int. Cl. ................................................. C09j 5/00
[50] Field of Search .......................................... 156/311,
321, 583

[56] References Cited
UNITED STATES PATENTS
2,766,809  10/1956  Parham .................... 156/311
3,298,887  1/1967  Van Hartesveldt et al. .. 156/311
FOREIGN PATENTS
675,295  12/1963  Canada ...................... 156/321

*Primary Examiner*—Reuben Epstein
*Attorney*—Victor G. Laslo

ABSTRACT: Method for controlling the heating and cooling steps in adhesive bonding of helicopter rotor blades and similar articles containing metal masses which serve as heat sinks. To bring the temperature at the adhesive bond line equally to flow temperature, local heaters, which roughly define separate zones of a metal pressure fixture, are separately energized to raise the zone temperatures unequally, to compensate for the local drain of heat into the heat sink. For cooling, liquid is pumped through passages while the local heaters cycle on as required to equalize the rate of cooling.

Inventors
JOHN T. PARSONS
JACK L. RITCHEY

By Jerome␣␣␣
Attorney

Inventors
JOHN T. PARSONS
JACK L. RITCHEY

METHOD FOR ADHESIVELY BONDING HELICOPTER ROTOR BLADE ASSEMBLIES

BACKGROUND OF THE INVENTION

This invention relates to methods and fixtures for adhesive bonding of helicopter rotor blades and other structural assemblies, particularly those which include heavy metal fittings, or have spanwise mass variations.

A problem of adhesive bonding under heat and pressure, as in conventional processes utilized for making helicopter rotor blades and similar assemblies, is to heat the parts to be bonded at a rate which is uniform along the adhesive bond lines or joints, i.e., the overlapping surface areas to be joined. Typical adhesives melt and flow at a temperature somewhat below the maximum temperature applied; for example an adhesive may flow at 275° F. but be cured at 340° F. With pressure applied during the heating process, if the adhesive along some portions of the bond line reaches the flow temperature prior to that along adjacent portions, those which first reach flow temperature may flow away under the applied pressure, resulting in voids along the bond line.

Another problem is to insure an even rate of cooling after curing the bond at elevated temperature. The cured adhesive does not develop its full strength until somewhat cooled. Uneven rates of cooling may result in such uneven contraction as to impose stresses on joints that have not yet developed their full strength.

Heretofore, even rates of heating and cooling could be attained only by slowing the rates of applying and withdrawing heat energy. This seriously slows production where the assembly to be bonded contains large localized metal masses, such as the root fittings of helicopter rotor blades, which on heating absorb heat, from the overlaying portions of the bond line.

The most generally used apparatus for heating such assemblies to be bonded are first bonding temperature is the autoclave. The assemblies to be bonded are first placed in a flexible bag from which air is then evacuated, to apply atmospheric pressure for bonding. Heating within the autoclave must be sufficiently gradual to allow for the drain of heat energy to heavy fittings and other metal masses which serve as heat sinks. There is no procedure for avoiding problems of accelerated cooling.

SUMMARY OF THE INVENTION

In contrast with adhesive bonding procedures which use an autoclave, the present invention utilizes a heat-conductive metal fixture having two principal parts defining a cavity in which the rotor blade or other assembly to be bonded is received and in which the rotor blade or other assembly to be bonded is received and in which bonding pressure is applied. Heating is applied by localized resistance heaters within the fixture so that more energy may be supplied to those zones of the cavity which overlay metal masses in the rotor blade assembly, which masses may function as heat sinks on heating and as heat sources on cooling. The rate of heating is accelerated, so that the very rapidity of temperature rise causes the conductive metal fixture halves to exhibit an appreciable lag in conductivity. Such conductivity lag effectively constitutes the area immediately adjacent to each heater as a roughly separate heating zone, and makes possible such unequal rates of heating the fixture as will achieve even heating of the blade assembly at the bond line.

As applied to the method of heating a fixture so as to bring the adhesive bond line uniformly to the flow temperature of the adhesive, the present method may be generally summarized as including the steps of enclosing the assembly to be bonded within such a heat-conductive fixture; applying bonding pressure to the bond line of the assembly; applying to zones of the fixture, which overlay metal masses in the assembly, heat energy sufficient to raise the fixture temperature at such zones a temperature increment so much greater than the temperature increment at contiguous zones as to compensate for the local drain of heat from the bond line to the metal masses therebeneath; and then progressively applying to the fixture zones sufficient heat energy to raise the temperature of each by a successive increment sufficient to continue such compensation for heat drain, until the entire adhesive bond line reaches flow temperature substantially simultaneously.

As applied to cooling after curing, the method includes the steps of withdrawing heat from the fixture, and while so doing, modulating the rate of cooling of each heating zone by supplying heat energy as required to cool the bonded assembly according to a predetermined timed cooling program.

As applied to programming the heat in production of rotor blades and similar assemblies, the method includes assembling a heat survey sample article which is structurally similar to the assembly to be bonded in production, including at intervals at the bond lines of such heat survey sample, flat temperature sensors; then enclosing the heat survey sample assembly in the bonding fixture and applying heat energy separately to the bonding fixture heating zones according to a trial program, in timed progression, until temperatures are raised suitable for curing the adhesive bond, meantime sensing the progression of temperatures both at the heat survey sample bond lines and at the overlaying zones of the fixture; then comparing the temperatures so sensed and analytically adjusting the amount and timing of heat energy, applied at each of the separate zones, so as to achieve substantial uniformity in temperature rise sensed along the bond lines and noting the temperatures at the overlaying zones of the fixture when this result is achieved. By then formalizing the application of such amounts of heat energy as a timed sequential program, thereafter to be applied to the production within the fixture of structurally similar assemblies, uniformity of temperature rise along the bond line is achieved in production by heating the several zones to produce that program of temperature rise in the fixture which corresponds to uniform heating of the bond line.

As applied to apparatus, the present invention may be generally summarized as comprising a pressure-applying adhesive bonding fixture including fixture portions contoured to provide a cavity having surfaces conforming to the contour of the article to be bonded; means to apply bonding pressure within the cavity; a plurality of separately energizable heater units within the fixture adjacent to the cavity surfaces, whereby the surface portions near the several heater units are constituted as roughly separating zones; means to sense the temperature in each such zone; and control means including said sensing means to energize each heater unit and to establish and hold the temperature in its zone at a series of predetermined levels. Additionally, for cooling, the fixture includes cooling passages for flow of liquid through the fixture portions under pressure, such cooling being operable simultaneously with the means which energize the heater units; so that cooling in each zone may be modulated by heating therein, to cool the zones according to a chosen program.

These features of invention, as well as others not included in this general summary, will be explained in the detailed specification which follows.

DESCRIPTION OF THE PREFERRED EMBODIMENT

Figure 2:
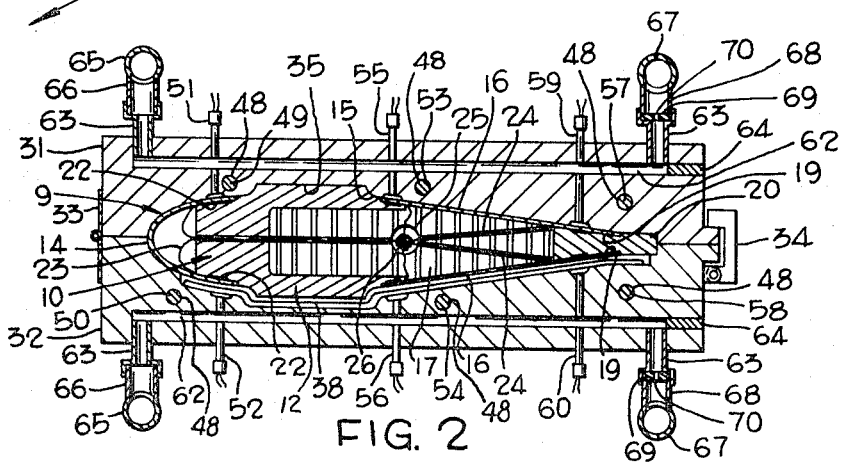
FIG. 2 is a sectional view taken along line 2—2 of FIG. 1, showing therein a typical root end cross section of a heat survey sample rotor blade, similar in its structure to the conventional production rotor blade to be bonded in the fixture. Fixture cooling provisions illustrated are typical of those shown in FIG. 1 at intervals along the length of the fixture.
Figure 3:
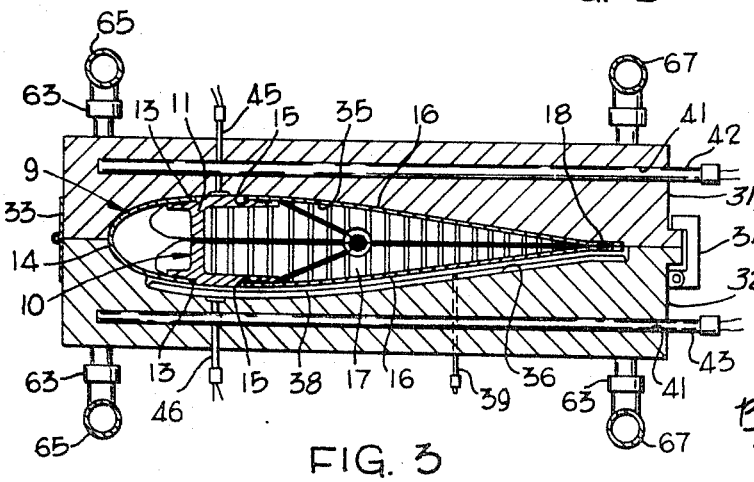
FIG. 3 is a sectional view taken along line 3—3 of FIG. 1, showing a typical midspan cross section of such heat survey sample rotor blade. Heating provisions illustrated are typical of those shown in FIG. 1 at intervals along the length of the fixture outboard of its root end.

Conventional helicopter rotor blades normally include, at their root end, elements whose cross section is greater than the typical cross section along the blade span. Structural elements of such a blade, whose design is adapted to assembly by adhesive bonding, are familiar. In practicing the present invention, identical structural elements are assembled into a heat survey sample blade generally designated 9 whose heavy root end cross section is shown in FIG. 2 and whose typical span cross section is shown in FIG. 3. The structural elements of such blade may include an extruded and machined spar generally designated 10, whose typical section 11 along the greater part of its span has forward and aft-extruding flanges, making it somewhat H-shaped as shown in FIG. 3. For retention to the helicopter hub, its integral root end portion 12 may be so enlarged at its forward side as to be solid; and the remainder of it so greatly thickened above, below, and to the rear, as to constitute a somewhat C-shaped root spar section 12 shown in FIG. 2.

Along the forward side of the spar 10 at its typical section 11 and root section 12 are milled upper and lower forward faying surfaces 13 in which a curved leading edge plate 14 is received for bonding with adhesive bond material therebetween. Similarly, upper and lower aft faying surfaces 15 milled in the spar 10 receive aft airfoil skins 16.

On the aft side of the spar 10 and between the skins 16, an afterbody fill 17 of honeycomb or other lightweight material may be utilized. In the typical section shown in FIG. 3, the aft skins are joined behind the afterbody fill 17 and adhesively bonded together at a trailing edge juncture 18. At the blade root section, shown in FIG. 2, the skins 16 may be bonded to and within faying surface indentations 19 in a trailing edge root fitting 20. Such conventional construction is suited for adhesive bonding of all the described structural parts in a single heat-and-pressure curing operation.

Figure 1:
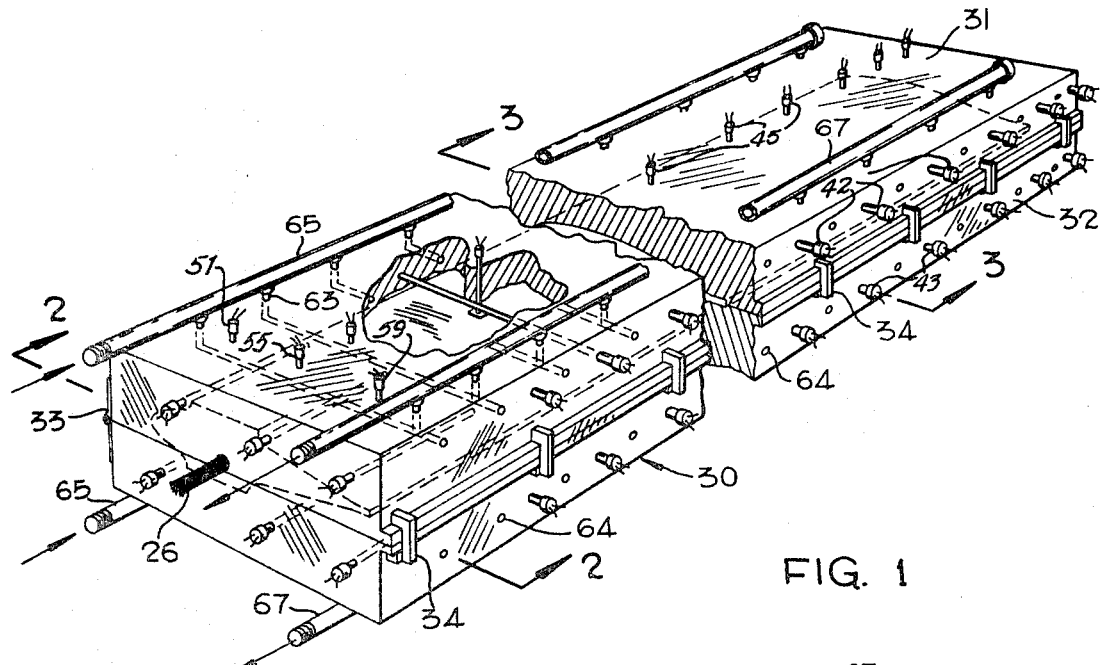
FIG. 1 is a perspective view, partly broken away, showing an adhesive bonding fixture embodying the present invention, constructed to bond a conventional helicopter rotor blade.

The heat survey sample rotor blade 9 illustrated in FIGS. 2 and 3 differs from such conventional construction only in that, within the adhesive bond lines defined by a faying surfaces 13, 15, and 19 are bonded flat temperature sensors 22 connected by conductive wires 23, drawn through drilled passages 24 in the spar 10 and afterbody fill 17 to a spanwise passage 25 at which they are drawn together in a bundle 26. The bundle 26 is carried through the end of the fixture, as shown at the left of FIG. 1, for observation at a control panel, not shown. Otherwise, the heat survey sample blade 9 illustrated in FIGS. 2 and 3 is structurally identical in materials and dimensions, to the rotor blade to be bonded in production.

The adhesive bonding fixture, generally designated 30 and shown in perspective in FIG. 1, is designed to enclose and heat a helicopter rotor blade assembly and apply pressure for adhesive bonding, so that the structural components of the blade may be adhered and cured in a single operation. The fixture 30 includes upper and lower fixture portions or halves 31, 32 joined together at the longitudinal edge corresponding to the leading edge by a continuous hinge 33 and securable at the trailing edge by a plurality of hinged clamps 34 spaced along the span of the fixture 30. The fixture halves 31, 32 have inner upper and lower cavity surfaces 35, 36 contoured to conform to the contour of the helicopter rotor blade to be bonded therein, save that the lower cavity surface 36 is lowered sufficiently from the contour to accept a flat flexible pressure bag or cushion 38, shown in cross section in FIGS. 2 and 3, inflatable through an inlet tube 39. The pressure bag 38 is preferably constructed in the manner shown in U.S. Pat. No. 3,348,476; inflation dilates its thickness only slightly, so as to take up tolerances and apply even pressure against the parts in the cavity, to be resisted at the opposite cavity surface 35. Such a cavity-fitted pressure bag or cushion 38 is especially suitable for bonding broad areas; thus, in addition to adhering the principal structural members to each other, it serves also to join the skin 16 to the aft section fill 17. If the only problem were merely to bond long spanwise elements to each other, different pressure-applying means might be used, such as the pressure urged metal rails aligned along lines to be bonded and shown in U.S. Pat. No. 3,376,184.

The upper and lower fixture halves 31, 32 are formed of a heat conductive metal, for example aluminum. If heat were applied to the fixture 30 at an extremely slow rate, the conductivity of the metal of the fixture would assure uniform heating, regardless at what portion of the fixture heat were applied and regardless of the presence of localized metal masses within the fixture's cavity. To achieve quantity production, however, both heating and cooling of the fixture must be rapid. The heating and cooling provisions and methods now to be described bring about what is in effect a zoned system of heating and cooling, despite the conductivity of the fixture.

Figure 4:
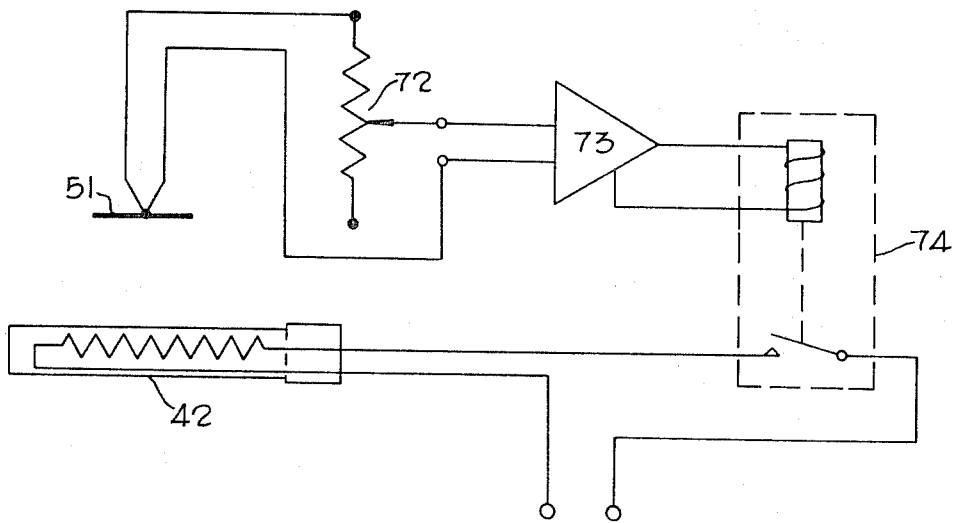
FIG. 4 is a simplified schematic wiring diagram of an adjustable temperature control for a single-heater element of the fixture of FIG. 1. Each such heater element may have a similar control.

For purposes of heating, the provisions shown in FIG. 3 are typical along the span, except at its root end. Chordwise bores 41 in the upper and lower fixture halves 31, 32, spaced at intervals along the span of the fixture 30 outward of its root end, receive cylindrical rodlike upper and lower electrical-resistance heaters 42, 43 which extend over nearly the entire width of the fixture 30. Each of the heaters 42, 43 is supplied with electrical energy from a source not shown and controlled by control means such as illustrated in FIG. 4, to apply temperature increments in timed steps. Because the rate of heating is rapid, there is a finite lag in conducting the heat; hence each of the separately energizable heater units 42, 43 constitutes a portion of the cavity surface 35, 36 adjacent to it as a roughly separate heating zone.

To control each of the heaters 42, 43, control means are utilized, including a temperature sensor at or adjacent to the cavity surface 35, 36 fairly close to each of the several heater elements 42, 43. For example, embedded in the cavity surface 35 near each of the upper heater elements 42 is an upper temperature sensor 45, which may be a thermocouple which creates an electric current, when heated, for control circuit shown schematically in FIG. 4. Similarly, embedded in the lower cavity surface 38 adjacent to each of the lower heater elements 43 a lower temperature sensor 46, whose system for controlling the lower heater elements 43 may be identical with that shown in FIG. 4. The control circuitry which includes the sensors 45, 46, energizes each of the heater units 42, 43 to bring and hold the cavity temperature at its zone to a series of predetermined levels, so that temperature increments may be applied to certain of the fixture by zones differing from the temperature increments at contiguous zones.

Since helicopter rotor blades have structural properties which normally vary gradually along the greater portions of the blade span, the chordwise heater elements, located at intervals as shown in FIG. 1, may be sufficient to establish the desired temperature differentials in the cavity surface portions outboard of the root end. At the root end, however, the metal masses of the rotor blade are normally much increased, to withstand localized loads. Such increase in mass is shown by comparison of the root end blade cross section FIG. 2 with the typical blade cross section of FIG. 3. The typical spar section 11, shown in FIG. 3, is of relatively slender H-shape; the root end spar section 12 is a massive C-shape. Its mass causes it to serve as a heat sink, whose presence will delay local heating at the bond line, unless the rate of heating the overlaying zones of the fixture may be increased to compensate.

Such compensation is effected in the present case not only be effective separateness of the heating zones, but by utilizing at the root end section more heating elements, which may extend spanwise into the root end of the fixture 30. As shown in FIGS. 1 and 2, three spanwise root end bores 48 are spaced at intervals in each of the upper and lower fixture halves 31, 32. Within the most forward spanwise bores 48 are received forward upper and lower root end heater elements 49, 50 to be controlled by upper and lower temperature sensors 51, 52 in the upper and lower cavity portions 35, 36 adjacent to the bond lines of the leading edge plate 14. Near the bond lines of the aft skins 16 to the spar 12, similar upper and lower chordwise heating elements 53, 54 are located, controlled by upper and lower temperature sensors 55, 56. Near the trailing edge fitting 20, upper and lower heater elements 57, 58 are located, controlled by upper and lower temperature sensors 59, 60.

To the extent that the inflatable pressure cushion 38 may lessen thermal conductivity from the lower fixture half 32, its presence is compensated for by applying more heat energy to the heater units in such fixture half.

Control of each of the separate heater units 42, 43, 49, 50, 53, 54, 57, 58 may be by a separate circuit in which the nearby associated temperature sensor 45, 46, 51, 52, 55, 56, 59, 60 is a part. Suitable circuitry, somewhat simplified, is illustrated in FIG. 4, inn which the sensor 51, a thermocouple, generates electric current as a function of temperature rise. Each thermocouple 51 has leads to a variable takeoff or temperature controller 72, at a control panel, not shown. The portions of the current taken off by the controller is sent through an amplifier 73, which provides a fixed rate of gain and connects to a normally closed relay-operated switch 74, so connected in a circuit as to switch on and off the electrical current supplied to the resistance heater 42 from a current source, not shown. Accordingly, when that portion of the current, so generated at the thermocouple 51 and taken off by the controller 72 and amplified by the amplifier 73, reaches the magnitude necessary to actuate the relay switch 74, it thereby opens the electrical circuit and deenergizes the resistance heater 42, until a drop in temperature permits the relay switch 74 to close, reenergizing the heater 42.

Similar circuits are provided for each of the upper and lower heater elements 42, 43, 49, 50, 53, 54, 57, 58. Conveniently, the temperature control 72 of the several circuits is located on a remote control panel, not shown.

Rapid cooling after the completion of curing the adhesive is important for productivity, so that the fixture 30 may be reused for bonding another blade as soon as possible. In the present invention, means are provided to cool the several zones of the fixture 30 according to a timed program; and to so cool each zone as to absorb the heat from the localized metal masses or heat sinks therein.

The cooling provisions are best shown in FIG. 2. Chordwise cooling passages 62 are provided at intervals along the span, in the upper and lower fixture halves 31, 32, by drilling horizontally from one side (the right side shown in FIG. 2); then drilling short vertical connecting bores near the forward and aft edges of the fixture and inserting vertical connector fittings 63; and then sealing the aft ends of the passages 62 with plugs 64. Upper and lower forward cooling manifolds 65 and manifold branches 66 are screwed to the forward connector fittings 63. Similarly, upper and lower rear flow outlet manifold 67 and manifold branches 68 are similarly connected to the connector fittings 63, except that at each rear mainfold branch 68, a disk 69 having a pressure-regulating orifice 70 is interposed.

Coolant liquid, which may be water pumped under pressure from a source not shown, is supplied to the forward cooling manifolds 65, flows inward through the manifold branches 66 and connector fittings 63 to the cooling passages 62, and outward through the pressure-regulating orifices 70 of the disks 69 and through the rear outlet manifolds 67, for recirculation. The size of the orifices 70 is so regulated as to fix a point of principal pressure drop in the coolant-circulating system. This permits maintaining the pressure, at which the coolant liquid is pumped, sufficiently high to avoid vaporization, as the liquid cools the fixture 30 from a bonding temperature higher than the atmospheric boiling point of the liquid. Another function which the orifices 70 may serve is to provide such compensation as may be necessary for suitable distribution of the pumped coolant liquid along the span of the fixture 30.

To effect cooling by zones, the rate of cooling of each zone is modulated by energizing the heater unit therein. Since the capacity of the pumped coolant liquid system may be very great, modulation of cooling by cycling the heater units in each zone limits the rate of cooling therein. So limited, the entire fixture 30 is cooled according to a timed program. The precise manner in which the heater control circuits function during cooling will be described subsequently.

To establish and verify programs of heating and positioned to be used for quantity production of helicopter rotor blade assemblies, the following steps are taken. First, the structurally similar heat survey sample rotor blade generally designated 9 is assembled. Its spar 10, leading edge plate 14, aft fill 17, aft skin 16, and root trailing edge fitting 20 are provided with adhesive bonding material inserted in the bond lines defined by the overlapping surface areas to be joined and assembled together for bonding with the flat temperature sensors 22 assembled at intervals in the bond lines. One or more of such temperature sensors 22 is position to be in register with each of the fixture heating zones. The heat survey sample assembly 9 is then enclosed in the bonding fixture 30, and the clamps 34 closed. Either at the start of the heating cycle or progressively during the cycle, bonding pressure is applied by supplying air under pressure to the pressure cushion 38.

Heat energy is applied, separately to each of the zones, by energizing their respective heater elements according to an estimated trial program, in a timed progression, raising the temperature in each zone of the fixture to the temperature, say 275° F., for flowing the adhesive in the bond line, and then to the temperature suitable for curing, say 340° F. The object of such trial program is to work out a first approximation of a timed progression of settings of the temperature controllers 72, which will supply the heat energy requirements for each zone, maintain equality of temperatures sensed at the bond line and achieve a rapid rate of heating thereat.

As the first increment of heating is applied to each zone, the actual bond line temperatures in the heat survey sample blade 9, as sensed by the sensors 22, are noted and recorded in comparison to the temperatures maintained by the controllers 72 at the overlaying zones of the fixture. During temperature rise, there will be such a temperature lag in the conductive metal of which the fixture halves 31, 32 are formed as to permit the controllers 72 for adjacent zones to be set at differing temperatures; thus the temperatures in the zones near the root end may be set to cycle at higher temperatures, to overcome the heat drain from the bond line into the heavy metal masses there located. After such time as is necessary to raise all or most of the temperatures measured by bond line sensors 22 substantially equal amounts, each of the temperature controllers 72 is set up to bring the temperatures of the fixture zones up additional increments of temperature, which again are higher in zones which overlay the heat sinks; and again the progression of temperatures in the bond line sensors 22 is noted. By such a progression of increments, the bond line temperatures so sensed in the heat survey sample 9 are carried through the flow temperature of the adhesive, to its curing temperature.

A comparison of the progression of temperatures actually sensed at the bond lines with the temperature settings of the controllers for the heating zones, affords the basis for analytical adjustment by which a second trial-heating program is devised, in which the heat survey sample blade 9 is again heated from room temperature to curing temperature. By successive analytical adjustments a program of controller settings is formalized, by time and setting increments, at which the temperatures sensed along the adhesive bond lines of the sample blade 9 will rise substantially uniformly. When such a program has been achieved and formalized, it is applied thereafter in production to the structurally similar rotor blade assemblies. The heat survey sample 9 may also be used to devise a cooling program, in the same manner. In any event, it is saved for verification from time to time of the correct working of the heaters and their controls.

In production thereafter the program of controller settings, by time and temperature increments, is followed out precisely.

The steps followed, generally summarized, are: enclosing the rotor blade assembly to be bonded in the fixture 30; applying such different amounts of heat energy to the separate heating zones as will achieve substantially uniform temperature rise along the adhesive bond lines, until flow temperature for the adhesive is reached; continuing to apply heat energy to bring the bond lines to curing temperature; and maintaining such curing temperature for a desired period of curing. Bonding pressure is applied by supplying air pressure to the inflatable pressure bag 38. Having heated the bond lines at a uniform rate, the adhesive will reach its flow temperature uniformly along the bond lines, and premature flow under pressure at any bond line area is avoided. If desired, the pressure may be applied in increments, so that the final pressure increment is not applied until after the adhesive has reached its flow temperature.

A final step of any method of adhesive bonding at elevated temperature is withdrawing the heat from the possible. Accelerated cooling would tend to leave large amounts of heat stored in the blade masses which serve as heat sinks, causing dangers of warping and imposing great stresses on the newly cured adhesive bonds. Thus analogous to the zoned heating program, it is important to provide a zoned cooling program, whereby the blade temperature may be reduced substantially uniformly as rapidly as possible The preferred method of cooling is to pump the coolant liquid through the fixture halves 31, 32 at a pressure which will avoid vaporization at the curing temperature. The controllers 72 are set down a temperature increment so that the current generated by each thermocouple 51 will hold its relay switch 74 open, breaking the circuit to the heater 52 until the zone temperature has dropped the chosen increment. The heaters 42 will then be energized and will cycle to maintain the temperature established by the controller 74 until it is reset downward for a further increment of cooling. This procedure will bring the cavity temperature down uniformly. If it is desired to achieve uniformity of cooling at the bond line itself, a program of cooling may be established in the same manner as the heating program, utilizing the heat survey sample blade 9. When the bonded blade is cooled to a temperature sufficiently low to avoid warpage and undue stresses the clamps 34 are opened and the blade is removed from the fixture 30, so that it becomes quickly available for bonding another blade.

The present method may be viewed as a method of adhesive bonding under pressure and at elevated temperature, in which the fixture is heated unequally to bring the bond line quickly and uniformly to flow temperature of the adhesive, despite the presence of metal masses which serve as heat sinks to drain heat locally away from the adhesive bond lines. So viewed, the method consists of the steps of enclosing the assembly to be bonded within the heat conductive fixture, applying pressure to the assembly bond line, and heating the fixture according to a zoned timed program. In applying the heating program, heat energy is applied to each zone which overlays a metal mass so as to raise the fixture temperature at such zone first increment greater than the first temperature increment at contiguous zones, by an amount sufficient to compensate from the local drain of heat from the bond line into the metal mass. Promptly after the first temperature increment is achieved, further heat energy is applied to such metal mass overlaying zones to raise their temperature successive increments and to maintain their temperatures elevated above the temperatures at contiguous zones sufficiently to continue the compensation for the heat drain to the metal masses. By this method, the entire adhesive bond line reaches flow temperature substantially simultaneously, despite the presence of the metal masses which serve as heat sinks and despite the conductivity of the fixture; and similarly the entire adhesive bond line reaches curing temperature substantially simultaneously.

Many adhesives exhibit significant variation in strength properties depending on the particular heating cycle used. For such adhesives it is essential, if maximum strengths are to be developed consistently, that the adhesive throughout the assembly should experience the same rate of temperature rise and fall throughout the cycle of heating, curing and cooling. This is accomplished uniquely in the apparatus and method which have been described.

For ready understanding, the large metal mass which may be present at a rotor blade root has been referred to as a principal reason for use of the present apparatus and methods. However, the same problem is present where there are significant variations in mass between adjacent portions of the assembly, as, for example, where the spar cross section is increased or decreased. Further it will be apparent that the apparatus and method are valuable for bonding airfoil assemblies and other articles which may have only minor or gradual changes in mass and cross section, or are in these respects constant along the span.

Variations in both the specific apparatus and the steps of method herein described will be apparent from this specification to those familiar with the art. Accordingly the present invention should not be constructed narrowly but rather as coextensive with the claims hereof.

1. In the production of helicopter rotor blade assemblies by adhesive bonding along bond lines defined by contiguous surface areas to be joined, wherein an assembly is enclosed within a bonding fixture having heating zones overlaying the assembly bond lines, the method of applying programmed heating to the fixture bonding zones to cause a uniform temperature rise along the bond lines, comprising the steps of:
   a. assembling a heat survey sample structurally substantially identical to the assembly to be bonded in production;
   b. enclosing the heat survey sample assembly in a bonding fixture having heating zones overlaying the assembly bond lines;
   c. applying, through adjustable control means, heat energy separately to such heating zones and adjusting said control means as necessary to achieve substantial uniformity of temperature rise along the assembly bond lines until temperatures are reached suitable for curing the adhesive bond to be formed in production; and
   d. recording such adjustment of said control means to thereby establish a timed program of heating, and thereafter adjusting said control means to apply heat to each subsequent production assembly in accordance with said timed program.

2. Method according to claim 1, wherein when said heat survey sample is enclosed in said fixture, heat energy is initially applied to the heating zones of said fixture in incremental steps according to a trial program in which relatively more heat energy is applied to those heating zones overlaying large masses of assembly material which would be expected to act as localized heat sinks,
   wherein the progressions of temperatures at the assembly bond lines and at the overlaying heating zones of the fixture are sensed during each incremental step, the sensing of the progressions of temperatures at the assembly bond lines being by means of flat temperature sensors disposed at intervals in the heat survey sample bond lines, the sensing of the progressions of temperatures in the heating zones of the fixture being by means of a temperature sensor in each heating zone, each successive incremental step of said trial program being performed only after substantial uniformity of bond line temperatures is reached, and
   wherein upon completion of said trial program, the timed heating program is revised to cause the application of more heat energy to the fixture heating zones overlaying those areas of the assembly bond lines wherein the temperature rise was observed to lag behind that of adjacent areas.

3. Method according to claim 1, further including the step of cooling the bonding fixture down from curing temperatures by modulating the cooling of each heating zone by applying such amounts of heat energy thereto as necessary to reduce its temperature according to a predetermined cooling program wherein more heat energy is applied to the fixture heating zones overlaying those areas of the assembly bond lines which tend to cool more rapidly than adjacent areas.